United States Patent
Otschik et al.

(10) Patent No.: US 9,841,107 B2
(45) Date of Patent: Dec. 12, 2017

(54) MECHANICAL SEAL ARRANGEMENT HAVING SLIDING SURFACES OF DIFFERENT HARDNESS

(71) Applicant: EagleBurgmann Germany GmbH & Co. KG, Wolfratshausen (DE)

(72) Inventors: Joachim Otschik, Beuerberg (DE); Andreas Kretschmer, Geretsried (DE); Carsten Scholz, Eurasburg (DE); Rudolf Schicktanz, Geretsreid (DE); Andreas Schrufer, Wolfratshausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 84 days.

(21) Appl. No.: 14/780,662

(22) PCT Filed: Mar. 11, 2014

(86) PCT No.: PCT/EP2014/054658
§ 371 (c)(1),
(2) Date: Sep. 28, 2015

(87) PCT Pub. No.: WO2014/161704
PCT Pub. Date: Oct. 9, 2014

(65) Prior Publication Data
US 2016/0053895 A1   Feb. 25, 2016

(30) Foreign Application Priority Data
Apr. 4, 2013   (DE) .................. 10 2013 005 926

(51) Int. Cl.
*F16J 15/34* (2006.01)
*F16J 15/16* (2006.01)

(52) U.S. Cl.
CPC ......... *F16J 15/3496* (2013.01); *F16J 15/162* (2013.01)

(58) Field of Classification Search
USPC .................................. 428/408; 277/345, 358
See application file for complete search history.

(56) References Cited

U.S. PATENT DOCUMENTS 4,701,426 A    10/1987  Okuno et al.
5,909,879 A *   6/1999  Simpson .............. F16J 15/3496
                                                      277/399
(Continued)

FOREIGN PATENT DOCUMENTS

DE         19922665  A1   11/2000
DE       202006006425  U1    6/2006
(Continued)

OTHER PUBLICATIONS

International Search Report dated Jun. 25, 2014 in connection with PCT/EP2014/054658.
(Continued)

*Primary Examiner* — Archene Turner
(74) *Attorney, Agent, or Firm* — Locke Lord LLP; Scott D. Wofsy; Alicia J. Carroll

(57) ABSTRACT

The invention relates to a mechanical seal arrangement comprising: a rotating slide ring (2) having a first slide surface and a stationary slide ring (3) with a second slide surface which between them define a sealing gap 4, wherein the first and second slide surfaces have different hardnesses, wherein the harder slide surface has a diamond coating (20) and the softer slide surface is produced from carbon composite material, and wherein an average initial roughness $R_a1$ (of the diamond coating 20) is less than an average initial roughness $R_a2$ of the slide surface made from carbon composite material.

20 Claims, 2 Drawing Sheets

(56) References Cited

U.S. PATENT DOCUMENTS

Figure 1:
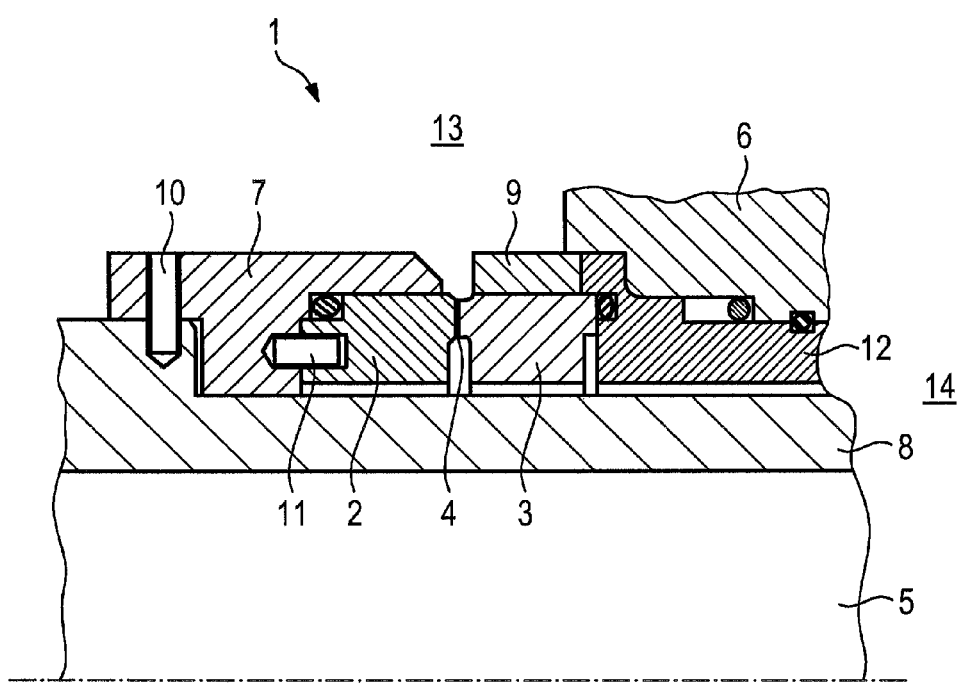

| | | | | |
|---|---|---|---|---|
| 2004/0222594 | A1* | 11/2004 | Fox, Jr. | F04D 29/023 |
| | | | | 277/358 |
| 2009/0060408 | A1* | 3/2009 | Nagasaka | C04B 41/009 |
| | | | | 384/625 |
| 2010/0061676 | A1 | 3/2010 | Sugiyama et al. | |
| 2010/0259011 | A1* | 10/2010 | Otschik | C23C 16/27 |
| | | | | 277/345 |
| 2013/0168928 | A1 | 7/2013 | Schrufer et al. | |
| 2013/0313785 | A1* | 11/2013 | Otschik | C23C 16/27 |
| | | | | 277/345 |

FOREIGN PATENT DOCUMENTS

| | | | |
|---|---|---|---|
| DE | 202010011173 U1 | | 12/2011 |
| EP | 0 675 303 | * | 10/1995 |
| EP | 0 900 059 | * | 9/1998 |
| JP | 2006194282 A | | 7/2006 |
| JP | 2008-297477 | * | 11/2008 |
| JP | 2010-024476 | * | 2/2010 |

OTHER PUBLICATIONS

Search Report of priority German Application No. DE 10 2013 005 926.7.

Korean Office Action dated Mar. 7, 2017, issued during the prosecution of Korean Patent Application No. 10-2015-7027393, and English translation thereof (19 pages).

\* cited by examiner

MECHANICAL SEAL ARRANGEMENT HAVING SLIDING SURFACES OF DIFFERENT HARDNESS

The present invention relates to a mechanical seal arrangement having slide rings which have different hardnesses and different initial roughnesses.

Mechanical seal arrangements are known in various forms from the prior art. For example, it is known to provide slide rings of mechanical seals with a diamond coating, (cf. DE 202007016868 U1). Furthermore, US 2010/0061676 A1 discloses a mechanical seal with a DLC coating with pure water as a sliding lubricant. In the area of mechanical seal arrangements identical slide rings made from the same material, i.e. with slide surfaces with the same hardness, are frequently used since otherwise it is to be expected that during use of slide surfaces with great different hardnesses, a high level of wear would occur on the softer slide ring. For this reason, mechanical seal arrangements have previously been designed such that the slide pairings have the same hardness.

However, when using diamond-coated slide surfaces in slide rings, in particular the problem of high costs arises. However, diamond-coated slide rings are highly resistant to wear and therefore have a particularly long service life.

The object of the present invention is therefore to provide a mechanical seal arrangement which, while being of simple construction and being easy and inexpensive to produce, nevertheless offers the possibility of using a diamond-coated slide surface.

This object is achieved by a mechanical seal arrangement having the features of claim 1. The dependent claims disclose preferred developments of the invention.

The mechanical seal arrangement in accordance with the invention preferably includes a rotating slide ring with a first slide surface and a stationary slide ring with a second slide surface. A sealing gap is defined between the two slide surfaces. In this respect, the two slide surfaces comprise different hardnesses, wherein one of the two slide surfaces has a diamond coating and the other of the two slide surfaces is formed from carbon composite material. The carbon composite material is a silicon carbide graphite composite material (SiC—C). The carbon composite material is therefore a composite material of graphite and silicon, wherein preferably liquid silicon is introduced into a porous graphite body, wherein silicon carbide forms in the free pores. This silicon carbide formation process is continued until the pores are completely filled with silicon carbide. A certain residual quantity of free silicon can also remain in the carbon composite material. Furthermore, an initial roughness, in accordance with the invention, on the slide surfaces with diamond coating is less than an initial roughness of the slide surface formed from carbon composite material. Initial roughness is understood to be an average roughness $R_a$ which the two slide surfaces have in the untouched state. Since the slide surfaces have different hardnesses, the initial roughness of the harder slide surface is selected to be less than the initial roughness of the softer slide surface of carbon composite material.

In a particularly preferred manner, the initial roughness of the harder slide surface with the diamond coating is at least 50% less than the initial roughness of the slide surface of carbon composite material. It is thereby ensured that in particular even in a run-in phase of the mechanical seal arrangement the harder slide surface does not damage the softer slide surface.

Also in a preferred manner, an average roughness $R_a$ for the slide surface comprising the diamond coating is in a range of 0.01 µm to 0.06 µm and/or an average roughness $R_a$ for the slide surface of carbon composite material is in a range of 0.1 µm to 0.2 µm. The average roughness $R_a$ of the slide surface with the diamond coating is preferably in a range of 0.02 µm to 0.05 µm. Also in a preferred manner, the average roughness of the slide surface of carbon composite material is in a range of 0.12 µm to 0.18 µm.

Also in a preferred manner, the diamond coating comprises doping such that the diamond coating is electrically conductive. In this way, the electrically conductive diamond coating is particularly suitable for mechanical seal arrangements in which the medium to be sealed off is water, in particular pure water, e.g. in power stations. In a particularly preferred manner, doping of the diamond layer to produce an electrically conductive diamond layer is boron doping.

In a particularly preferred manner, the diamond coating of the slide ring is additionally also provided on the outer peripheral region of the slide ring. The diamond coating is thus provided in a particularly preferred manner only partially on the outer peripheral region. Also in a preferred manner, the diamond coating tapers on the outer peripheral region in a direction away from the slide surface of the slide ring. The provision of the diamond coating on the outer peripheral region in particular makes it possible for the basic material of the slide ring to be protected by the diamond coating from a medium to be sealed off, e.g. pure water. Also in a preferred manner, a support ring is provided which covers the diamond coating provided on the outer peripheral region of the slide ring. A possibly aggressive medium is thereby prevented from reaching the basic material, in particular SiC, of the slide ring.

According to a further preferred embodiment of the invention, the diamond coating of the slide ring is additionally also provided on an inner peripheral region of the slide ring. In this connection, also in a preferred manner, the diamond coating is formed only partially on the inner peripheral region and in particular the diamond coating tapers on the inner peripheral region in a direction away from the slide surface.

Also in a preferred manner, the carbon composite material comprises 60 to 75% by weight silicon carbide, 15 to 40% by weight carbon and 0.5 to 10% by weight free silicon. In a particularly preferred manner the carbon composite material comprises 62% by weight silicon carbide, 35% by weight carbon and 3% by weight free silicon.

Also in a preferred manner, the slide surface of the diamond coating is polished. It is thereby ensured that the slide surface with the diamond coating has less initial roughness than the slide surface of carbon composite material.

The rotating slide ring preferably comprises the diamond coating. By rotation of the diamond-coated slide ring, in particular an extremely uniform thermal expansion behaviour and uniform cooling of the rotating slide ring can be ensured and so in particular heat-induced damage can be avoided.

Also in a preferred manner, a support portion of a surface of the diamond-coated slide surface is at least larger than 45%, particularly preferably larger than 50% and more preferably larger than 60%. In accordance with the invention, the support portion is to be a ratio of a surface, which includes the sum of all smooth regions of the surface, to a total surface of the slide surface. The smooth regions on the surface are obtained e.g. by polishing or fine polishing of the diamond-coated slide surface. If the entire surface of the diamond-coated slide surface could be polished so that only a smooth region were obtained on the surface, the support portion would be 100%.

The slide ring with the diamond coating preferably has a Vickers hardness of ca. 10 000 HV on the diamond coating and the slide ring of carbon composite material has a Vickers hardness in a range of 2 000 HV to 3 000 HV, preferably 2 500 HV in the region of the hard SiC phase, and a Rockwell hardness in a range of 50 to 100 HR15T in the region of the softer graphite phase. Also in a preferred manner, the diamond-coated slide ring has a modulus of elasticity in a range of approx. 1 150 N/mm$^2$ and the slide ring of carbon composite material has a modulus of elasticity in a range of 1 to 4 N/mm$^2$. Also in a preferred manner, the diamond-coated slide ring has a thermal conductivity in a range of approx. 2 000 W/mk and the carbon composite material has a thermal conductivity in a range of 2 to 85 W/mk. A thickness for the diamond coating on the slide surface in a range of 1 μm to 20 μm is preferred.

Also in a preferred manner, graphite-containing regions are formed on the slide surface of carbon composite material. These graphite-containing regions on the surface of the slide surface are arranged to receive free particles which can be located e.g. in the medium to be sealed off or in a blocking medium. By virtue of the graphite-containing regions on the surface of the slide surface of carbon composite material, free particles can therefore be received and embedded and so they cannot bring about any damage to the opposing slide surface. Even if a free particle such as this were still protruding partially out of the slide surface of carbon composite material, no damage to the mechanical seal occurs since the counter surface comprises the diamond coating which cannot be damaged, e.g. scratched or the like, by the particle only partially received in the softer graphite-containing region. The graphite-containing regions on the surface of the slide surface of carbon composite material thus have a Rockwell hardness in a range of 50 to 100 HR15T. The free particles which can be produced e.g. by abrasion or the like or can also be present in the medium to be sealed off when this is e.g. a suspension with hard particles, cannot damage the extremely hard diamond coating and, upon contact with the diamond coating may simply be pressed deeper into the slide surface of carbon composite material or be sheared off.

Furthermore, the present invention relates to a power station feed pump comprising a mechanical seal arrangement in accordance with the invention. In particular in the case of using the mechanical seal arrangement in accordance with the invention in power station feed pumps, considerable advantages are achieved since the mechanical seal arrangement in accordance with the invention is extremely robust and has a long service life. This assures against the risk of failure of the mechanical seal arrangement in particular in power station operation which is normally arranged for long operating periods between two maintenance intervals.

A preferred exemplified embodiment of the invention is described in detail hereinunder with reference to the accompanying drawing.

Figure 2:
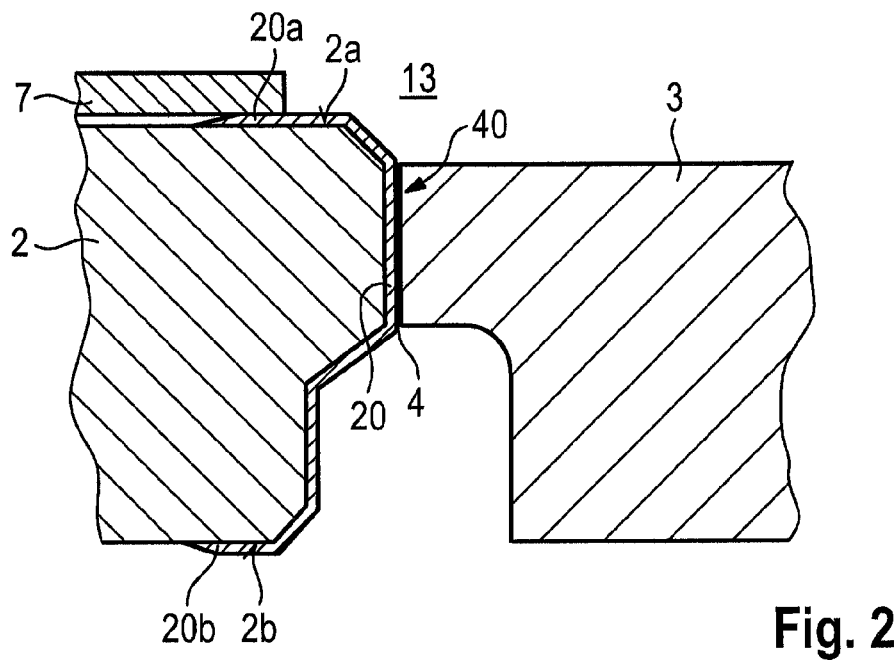
Figure 3:
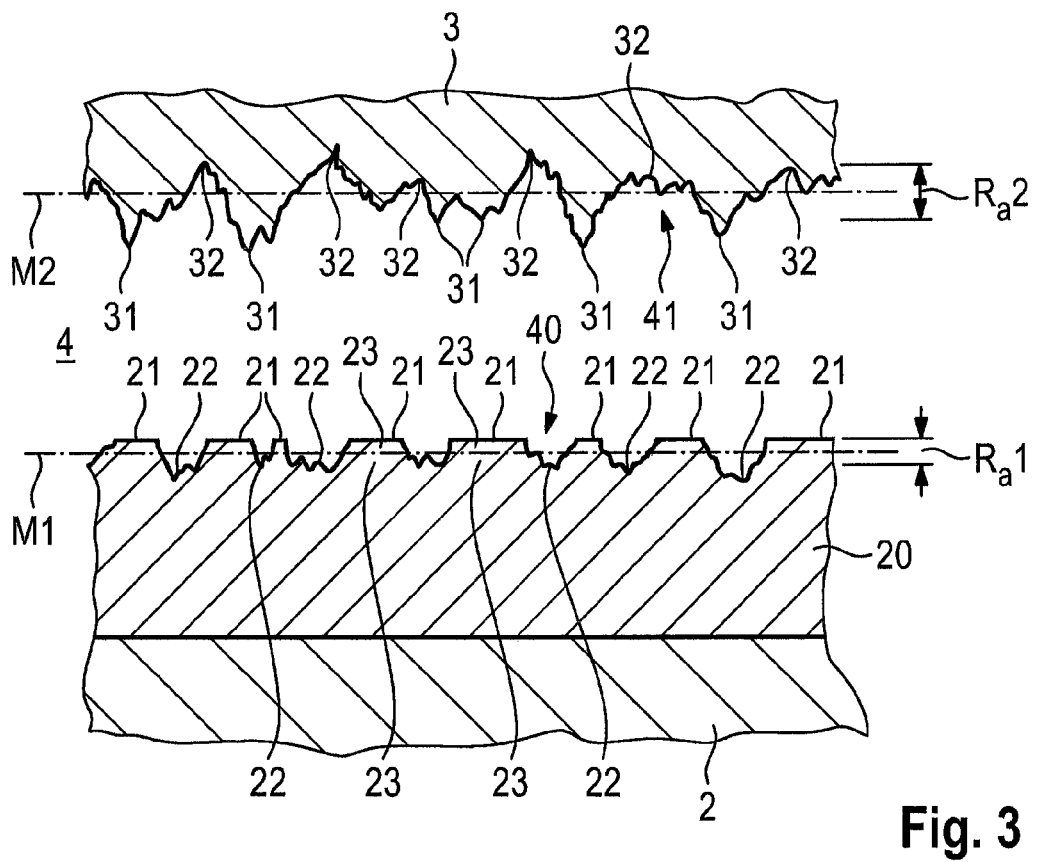

In the drawing:

FIG. 1 is a schematic cross-sectional view of a mechanical seal arrangement for a power station feed pump in accordance with one exemplified embodiment of the invention, FIG. 2 is an enlarged cross-sectional view of the slide rings of FIG. 1 and FIG. 3 is a further enlarged schematic cross-sectional view of the slide rings of FIG. 1 and FIG. 2.

A mechanical seal arrangement 1 according to one preferred exemplified embodiment of the invention is described in detail hereinunder with reference to FIGS. 1 to 3.

FIG. 1 schematically shows the mechanical seal arrangement 1 for a power station feed pump comprising a rotating slide ring 2 and a stationary slide ring 3. A sealing gap 4 is formed in a known manner between the two slide rings 2, 3. The rotating slide ring 2 is connected to a shaft bushing 8 via a rotating support ring 7. First and second pins 10, 11 are provided for rotation and for transfer of torque. The shaft bushing 8 is arranged on a rotating shaft 5.

The stationary slide ring 3 has a binding 9 which is fixed to a housing 6 via a stationary support ring 12.

The mechanical seal arrangement 1 thus seals off a medium 13, to be conveyed by the power station feed pump with respect to the surroundings 14. The medium 13 in this exemplified embodiment is pure water. The poor electrical conductivity of the pure water and the high sliding speed of the rotating slide ring 2 result in high electric potentials of a number of volts between the slide rings. The sliding speeds are conventionally between 40 m/s to 60 m/s.

The rotating slide ring 2 is further provided with a diamond coating 20. In so doing, the whole slide surface 40 of the rotating slide ring 2 is coated with diamond. This is shown in detail in FIGS. 2 and 3.

The diamond coating 20 is thus formed both on a slide surface 40 of the rotating slide ring 2 and also on an outer peripheral region 2a and an inner peripheral region 2b. Thus a region 20a tapering in the direction away from the slide surface 40 is formed on the outer peripheral region 2a. In the same manner, a region 20b tapering in the direction away from the slide surface 40 is formed on the inner peripheral region 2b of the slide ring. In other words, the diamond coating 20 is also partially provided on the inner and outer periphery of the slide ring.

Furthermore, the rotating support ring 7 partially covers the outer, tapering region 20a of the diamond coating. It is thereby ensured that the medium 13 located on the outer periphery does not come into contact with the base material of the slide ring 2. In this way, the diamond-coated rotating slide ring can also be used in highly aggressive media. The diamond coating protects the basic material of the slide ring. By virtue of the tapering region 20a on the outer peripheral region of the slide ring, in particular a very good seal can be obtained between the support ring 7 and the tapering region 20 of the diamond coating.

As also shown in FIG. 3, the diamond coating 20 is subjected to a polishing step after the coating process and so in addition to the depressions 22 still present, a multiplicity of flattened regions 21 are formed. In order for the diamond layer to be electrically conductive, it also comprises boron doping 23.

The stationary slide ring 3 is produced from a carbon composite material which includes approx. 62% by weight silicon carbide, approx. 35% by weight graphite and a small proportion of ca. 3% by weight free silicon. A slide surface 41 of the stationary slide ring 3 has a multiplicity of raised areas 31 and depressions 32 on the surface of the stationary slide ring.

FIG. 3 shows the average roughness $R_a$. The average roughness $R_a$ is an arithmetical average value of all deviations of the roughness profile from a centre line. In the diamond coating 20 the centre line is designated by M1 and on the roughness profile of the stationary slide ring 3 by M2. The average roughness in the case of the diamond coating 20 is designated by $R_a1$ and the average roughness $R_a$ in the case of the stationary slide ring 3 is designated by $R_a2$.

It is thus clear that the average roughness $R_a1$ of the diamond coating 20 is clearly smaller than the average roughness $R_a2$ of the stationary slide ring 3 made from carbon composite material. The reason for this is that the surface of the diamond coating 20 has been subjected to a further polishing step to form the flattened regions 21. Between the flattened regions 21, depressions 22 are present in each case. The stationary slide ring 3 made from carbon composite material has not been polished or has been polished less than the diamond-coated rotating slide ring 2.

The selection of the different materials for the rotating and stationary slide rings means that, by reason of the diamond coating 20 on its slide surface 40, the rotating slide ring 2 also has greater hardness on the slide surface than the stationary slide ring 3 produced from the carbon material. In accordance with the invention, the reduced roughness profile on the diamond coating 20 means that a harder rotating slide ring 2 can now run against a softer stationary slide ring 3 without this causing damage or abrasion or wear or the like on the softer stationary slide ring 3. By virtue of the lower average roughness $R_a1$ of the harder diamond coating 20 it is therefore possible to prevent the increased wear usually expected with such a slide ring pairing.

This discovery which is also surprising to a person skilled in the art now makes it possible for mechanical seal arrangements to be able to be used in which only one of the slide rings, particularly the rotating slide ring 2, has been provided with a diamond layer 20. The other, softer slide ring has no such hard layer but rather has a slide surface of carbon composite material. Nevertheless, a long service life for the mechanical seal arrangement 1 corresponding to a service life of a mechanical seal arrangement in which both slide rings have a diamond coating can be obtained.

Furthermore, the doping 23 in the diamond coating 20 ensures that between the two slide rings no high electric potential occurs between the two slide rings and so the slide surfaces 40, 41 cannot be destroyed by electric discharges.

Therefore, the mechanical seal arrangement 1 in accordance with the invention is suitable particularly for use in feed water pumps of power stations, which are frequently started up and stopped and in which constantly changing thermal conditions are present. Nevertheless, the mechanical seal arrangement in accordance with the invention is highly robust and has a long service life.

The support portion of the slide surface 40 of the diamond coating 20 is about 60%. The support portion is defined as the quotient of the sum of all flattened regions 21 with respect to the total surface of the slide surface 40 on the diamond coating 20 (annular surface).

In this exemplified embodiment an average roughness $R_a1$ of the diamond coating 20 is about 0.03 μm and an average roughness $R_a2$ of the slide surface 41 of the stationary slide ring 3 made from carbon composite material is about 0.15 μm. In other words, the average roughness $R_a2$ of the carbon composite material on the stationary slide ring 3 is about five times as high as the average roughness $R_a1$ of the diamond coating 20.

LIST OF REFERENCE NUMERALS 1 mechanical seal arrangement
2 rotating slide ring
2a outer peripheral region
2b inner peripheral region
3 stationary slide ring
4 sealing gap
5 shaft
6 housing
7 rotating support ring
8 shaft bushing
9 binding
10 first pin
11 second pin
12 stationary support ring
13 medium
14 surroundings
20 diamond coating
20a tapering region on the outer periphery
20b tapering region on the inner periphery
21 flattened regions
22 depressions
23 boron doping
31 raised areas
32 depressions
40 slide surface diamond coating
41 slide surface carbon composite material
$R_a1$ average initial roughness of the diamond coating
$R_a2$ average initial roughness of the carbon composite material
M1, M2 reference line

The invention claimed is:

1. Mechanical seal arrangement comprising:
a rotating slide ring having a first slide surface and a stationary slide ring having a second slide surface which define a sealing gap between them;
wherein the first and second slide surfaces have different hardnesses;
wherein the harder slide surface has a diamond coating and the softer slide surface is produced from carbon composite material, wherein the carbon composite material is a silicon carbide graphite composite material comprising silicon carbide, graphite and free silicon; and
wherein an average initial roughness (Ra1) of the first slide surface of the diamond coating is smaller than an average initial roughness (Ra2) of the second slide surface made from carbon composite material, wherein the diamond coating of the slide ring is additionally provided on a non-sliding surface on an outer peripheral region of the slide ring.

2. Mechanical seal arrangement as claimed in claim 1, wherein the average initial roughness (Ra1) of the slide ring with the diamond coating is 50% less than the average initial roughness (Ra2) of the slide ring made from carbon composite material.

3. Mechanical seal arrangement as claimed in claim 2, wherein the average initial roughness (Ra1) of the diamond coating is in a range of 0.01 μm to 0.06 μm and/or that the average initial roughness (Ra2) of the slide surface made from carbon composite material is in a range of 0.1 μm to 0.2 μm.

4. Mechanical seal arrangement as claimed in claim 1, wherein the diamond coating has doping such that the diamond coating is electrically conductive.

5. Mechanical seal arrangement as claimed in claim 4, wherein the doping is boron doping.

6. Mechanical seal arrangement as claimed in claim 1, wherein the diamond coating is provided only partially on the outer peripheral region of the slide ring and in particular the diamond coating on the outer peripheral region has a tapering region.

7. Mechanical seal arrangement as claimed in claim 1, wherein a support ring at least partially covers the diamond coating provided on the outer peripheral region of the slide ring.

8. Mechanical seal arrangement as claimed in claim 1, wherein the diamond coating of the slide ring is additionally provided on an inner peripheral region of the slide ring.

9. Mechanical seal arrangement as claimed in claim 1, wherein the first slide surface of the diamond coating is polished.

10. Mechanical seal arrangement as claimed in claim 1, wherein the rotating slide ring comprises the diamond coating.

11. Mechanical seal arrangement as claimed in claim 1, wherein the first slide surface of the diamond coating has a support portion of ≥50%.

12. Mechanical seal arrangement as claimed in claim 1, wherein the carbon composite material comprises 60 to 75% by weight silicon carbide, 15 to 40% by weight carbon and 0.5 to 10% by weight free silicon.

13. Mechanical seal arrangement as claimed in claim 1, wherein on the second slide surface made from carbon composite material are formed graphite-containing regions, in particular with a Rockwell hardness of 50 to 100 HR15T, which are arranged to receive free particles.

14. Power station feed pump comprising a mechanical seal arrangement as claimed in claim 1.

15. Mechanical seal arrangement comprising:
   a rotating slide ring having a first slide surface and a stationary slide ring having a second slide surface which define a sealing gap between them;
   wherein the first and second slide surfaces have different hardnesses;
   wherein the harder slide surface has a diamond coating and the softer slide surface is produced from carbon composite material, wherein the carbon composite material is a silicon carbide graphite composite material comprising silicon carbide, graphite and free silicon; and
   wherein an average initial roughness (Ra1) of the first slide surface of the diamond coating is smaller than an average initial roughness (Ra2) of the second slide surface made from carbon composite material.

16. Mechanical seal arrangement as claimed in claim 15, wherein the average initial roughness (Ra1) of the slide ring with the diamond coating is 50% less than the average initial roughness (Ra2) of the slide ring made from carbon composite material.

17. Mechanical seal arrangement as claimed in claim 15, wherein the diamond coating has doping such that the diamond coating is electrically conductive.

18. Mechanical seal arrangement as claimed in claim 15, wherein the rotating slide ring comprises the diamond coating.

19. Mechanical seal arrangement as claimed in claim 15, wherein the first slide surface of the diamond coating has a support portion of ≥50%.

20. Mechanical seal arrangement comprising:
   a rotating slide ring having a first slide surface and a stationary slide ring having a second slide surface which define a sealing gap between them;
   wherein the first and second slide surfaces have different hardnesses;
   wherein the harder slide surface has a diamond coating and the softer slide surface is produced from carbon composite material, wherein the carbon composite material is a silicon carbide graphite composite material comprising silicon carbide, graphite and free silicon; and
   wherein an average initial roughness (Ra1) of the first slide surface of the diamond coating is smaller than an average initial roughness (Ra2) of the second slide surface made from carbon composite material, wherein the diamond coating of the slide ring is additionally provided on an outer peripheral region of the slide ring.

* * * * *